(12) United States Patent
Warnecke

(10) Patent No.: US 6,461,021 B1
(45) Date of Patent: Oct. 8, 2002

(54) REFLECTOR POSITIONING ASSEMBLY, AND ASSOCIATED METHOD, FOR LIGHTING APPARATUS

(75) Inventor: Russell A. Warnecke, Colorado Springs, CO (US)

(73) Assignee: Wybron, Inc., Colorado Springs, CO (US)

( * ) Notice: Subject to any disclaimer, the term of this patent is extended or adjusted under 35 U.S.C. 154(b) by 0 days.

(21) Appl. No.: 09/670,749

(22) Filed: Sep. 27, 2000

(51) Int. Cl.⁷ .............................................. F21V 14/04
(52) U.S. Cl. ..................... 362/282; 362/272; 362/275; 362/284; 362/322; 362/324
(58) Field of Search ................................ 362/272, 275, 362/282, 284, 322, 324; 359/876, 877

(56) References Cited

U.S. PATENT DOCUMENTS 5,367,407 A * 11/1994 Hugnell ...................... 359/876

* cited by examiner

*Primary Examiner*—Sandra O'Shea
*Assistant Examiner*—Guiyoung Lee
(74) *Attorney, Agent, or Firm*—Robert H. Kelly, Esq.

(57) ABSTRACT

A reflector-positioning apparatus, and an associated method, for a lighting assembly. Rotational forces are generated and applied to rotatable ring members. Rotation of the ring members is transduced to tilt and pan movements, as desired, of the reflector.

22 Claims, 4 Drawing Sheets

REFLECTOR POSITIONING ASSEMBLY, AND ASSOCIATED METHOD, FOR LIGHTING APPARATUS

The present invention relates generally to manner by which to direct light energy towards a target. More particularly, the present invention relates apparatus, and an associated method, for positioning a reflector to reflect incident light energy towards the target. Simple rotational forces are generated and transduced to cause desired tilt and pan movements of the reflector to direct the light energy towards the target, both a stationary target and also a moving target.

BACKGROUND OF THE INVENTION

Throughout the past century, the creation and installation of electrical power grids over large geographical areas has provided a manner by which to power a large assortment of electrically-powered devices. Lighting equipment is exemplary of a class of electrically-powered devices which is regularly used.

The illumination provided by the lighting equipment is used both for functional purposes and also aesthetic purposes. That is to say, illumination of an area for functional purposes by lighting equipment permits activities which require light for their effectuation to be performed. And, illumination also sometimes provides aesthetic improvements to the area which is illuminated. Aesthetic improvements provided by the lighting is sometimes combined with functionality provided by their illumination; other times, the illumination is provided primarily for aesthetic purposes.

Some lighting equipment is constructed to provide illumination for a single fixed area, or otherwise to direct light energy towards a fixed target or target area. Other constructions of light equipment, such as lighting equipment utilized as stage lighting, permit alteration of the target area towards which light energy generated by the lighting element is directed. Stage lighting equipment, typically, must be capable of dynamic alteration of the target area at which the light energy generated by the lighting equipment is directed. For instance, when a stage performer moves across the stage during performance, the stage lighting equipment must be capable of directing light energy generated thereat towards the stage performer as the stage performer moves.

While, most simply, the stage performer can be tracked manually by repeatedly repositioning the lighting element of the lighting equipment, thereby successively to redirect the direction in which the light energy is transmitted. Such entire repositioning of the lighting element, however, is relatively inflexible. And, such repeated repositioning over an extended time period is difficult to maintain, particularly when the stage performer moves repeatedly or rapidly.

To overcome these problems, lighting elements utilized for stage lighting purposes, or in other implementations in which the target area at which light energy is to be directed changes, a reflector is utilized to reflect light energy generated at a light source towards the target area. Movement of the reflector alters the direction by which the light energy is reflected off of the reflector. Through appropriate positioning of the reflector, the area which is illuminated by the lighting element can quickly be selected and thereafter illuminated.

Conventional lighting apparatus of this type typically utilize a motor coupled directly to the reflector to position the reflector in a desired position to reflect incident light energy thereon towards the selected target area. A motor is limited, both in the resolution of movement of the reflector as well as, perhaps more significantly, limitations of the movement permitted of the reflector. And, the positioning of the reflector into a desired position might not be effectuable in the quickest possible time period as the reflector might not be able to be repositioned out of one position and into another position by moving the reflector along a shortest distance path into the subsequent position. Constraints upon wiring associated with the motor might, e.g., limit the manner by which the reflector is repositioned.

Lighting apparatus of this type typically use a motor for rotational displacement of the mirror and a motor suspended on the rotational axis for angular displacement of the mirror. The movement of the angular displacement axis is limited by the mechanical axle used to suspend the mechanism in rotation, and the rotational axis is limited by the wires to transfer power to the angular displacement axis. Additionally, the weight of the reflector and the angular displacement actuator must be moved and accelerated by the rotational displacement axis which slows the response time for that axis.

If a manner could be provided by which to better permit movement of the reflector of lighting apparatus, then improved performance of the lighting apparatus in dynamic conditions would result. For instance, tracking of a stage performer as the performer moves across a stage would be facilitated. And, an improved manner by which to light other target areas would also be facilitated.

It is in light of this background information related to lighting apparatus that the significant improvements of the present invention have evolved.

SUMMARY OF THE INVENTION

The present invention, accordingly, advantageously provides apparatus, and an associated method, by which to direct light energy towards a target.

Through operation of an embodiment of the present invention, a manner is provided for positioning a reflector to reflect incident light energy towards a target. The reflector is positioned through the application of simple rotational forces which are transduced to cause the desired positioning of the reflector. Both tilt and pan movements of the reflector are provided through the application of the simple rotational forces.

In one aspect of the present invention, a rotatable ring member is positioned to receive a first rotational force. The first rotational force, when applied to the ring member, causes rotation thereof in a selected direction and at a selected rate. An upstanding mounting arm is positioned to extend beyond a surface of the ring member to rotate, about a first rotational axis, together with rotation of the first ring member. The reflector is mounted to the mounting arm to be supported therefrom. The upstanding mounting arm includes a directional transducer which transduces the rotational movement of the first ring member together with rotation of the upstanding mounting arm about the first rotational axis into rotation of the reflector about a second rotational axis, e.g., perpendicular to the first rotational axis. Thereby, tilt movement of the reflector is induced.

In another aspect of the present invention, a second rotatable ring member is provided. The second rotational ring member is also capable of rotational motion about the first rotational axis. A second upstanding mounting arm is affixed to the second rotatable ring member and is caused to rotate together with rotation of the second rotatable ring member. Rotation of the second rotatable ring member is effectuated through application of a second rotation force thereto. The reflector is further mounted to the second upstanding mounting arm. The second upstanding mounting arm includes a directional transducer operable to transduce the rotational movement of the second ring member into rotation of the reflector about a third rotatable axis. Rotation of the second ring member induces tilt movement of the reflector. The second and third rotatable axes, in one implementation, are coincident.

In another aspect of the present invention, the first rotatable ring member is caused to be rotated at a first rotation rate while the second rotatable ring member is caused to be rotated at a second rate. The difference between the rates at which the respective ring members are caused to be rotated defines a differential rate of rotation. Because the reflector is coupled, by way of the first and second upstanding mounting arms, respectively, to the first and second ring members, rotation of the respective ring members at the differential rate causes rotation of the reflector about the second and third rotational axes, respectively. Because of the differential rate at which the ring members are rotated, corresponding rotation about the second and third axes is also effectuated at a differential rate. The differential rate of rotation of the reflector about the axes causes tilt movement of the reflector.

Light energy incident upon the reflector can thereby be reflected, upon positioning, or movement, of the reflector in any desired direction. Rotational forces can be applied to the rotational ring members in either a clockwise or counter clockwise direction. Thereby, repositioning of the reflector is effectuable in a manner which most quickly causes pan or tilt movement of the reflector, as desired.

In one implementation, apparatus is provided for stage lighting equipment. Through suitable positioning of the reflector, light energy generated by a light source incident on the reflector is directed towards a desired target area. As a stage performer, or the like, moves across a stage, thereby changing the target area which is to be illuminated, rotation of the rotatable rings repositions the reflector to permit the stage performer to be tracked with illumination as the stage performer moves into the subsequent position.

In another implementation, operation of an embodiment of the present invention permits any type of target area to be quickly illuminated merely by rotation of the rotatable ring members to cause the appropriate target area to be illuminated. Landscape lighting, for instance, is made to be dynamically adjustable to permit illumination of selected landscape targets, merely through the rotation of the rotatable ring members to cause corresponding rotation of the reflector.

In these and other aspects, therefore, reflector-positioning apparatus, and an associated method, for a light assembly is provided. The light assembly is operable to reflect incident light energy towards a selected target location. A reflector from which light energy is reflected towards the selected target location is positioned to cause such reflection towards the target location. A first rotatable element is capable of rotational movement in a first selected rotational manner about a first rotational axis responsive to application of a first rotational force thereon. A first directional transducer is coupled to the first rotatable element and to which the reflector is mounted. The first directional transducer is rotatable about the first rotatable axis together with rotation of the first rotatable element. The first directional transducer transduces the rotation thereof about the first rotational axis into rotation of the reflector about a second rotational axis.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
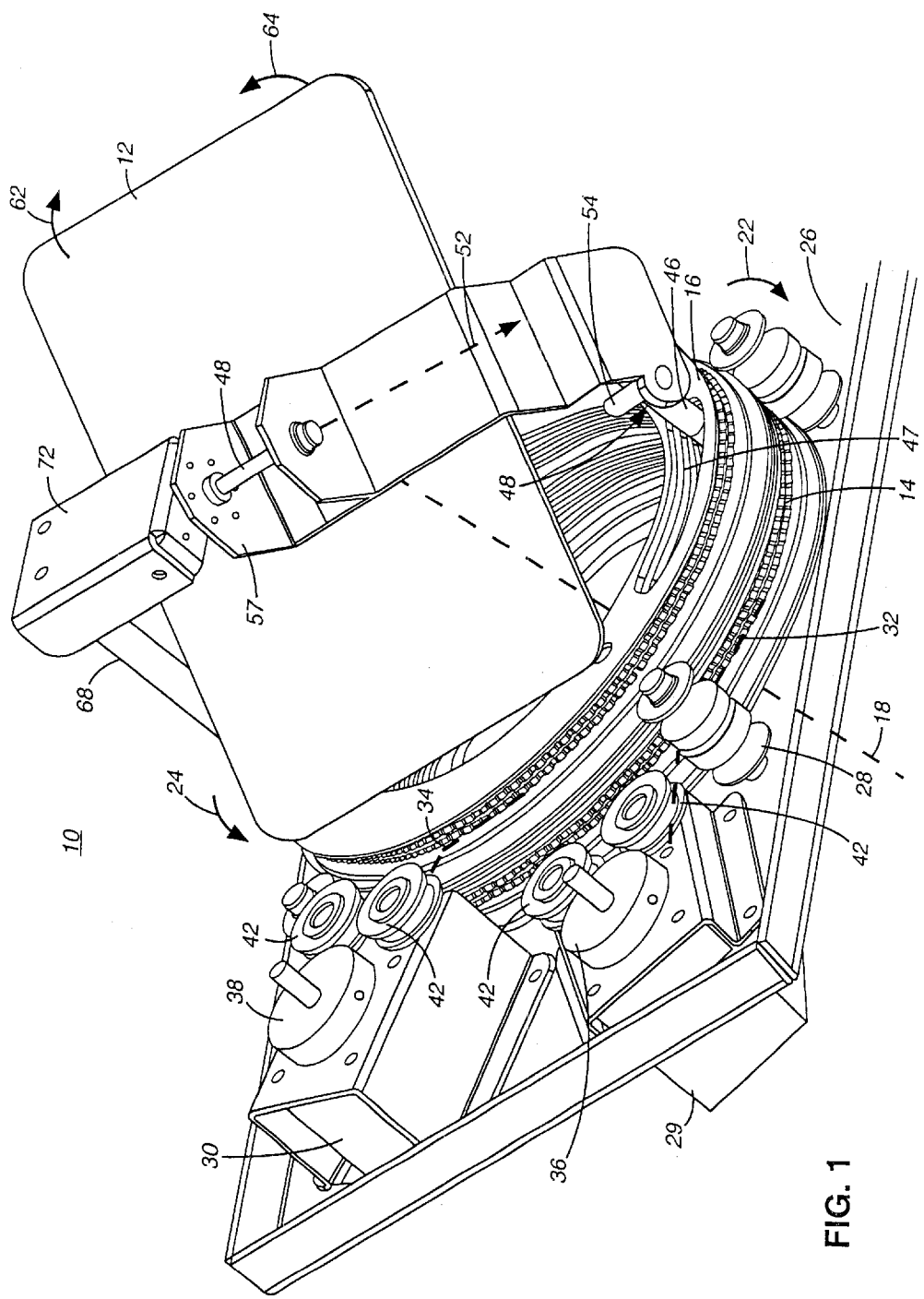
FIG. 1 illustrates a partial perspective, partial functional block diagram of the reflector apparatus of an embodiment of the present invention.

Referring first to FIG. 1, reflector-positioning apparatus, shown generally at 10, of an embodiment of the present invention, is operable to position a reflector 12 in a desired position. When positioned in the desired position, light energy incident thereon is reflected in a desired direction, thereby to illuminate a desired target area. The reflector-positioning apparatus provides for dynamic readjustment of the positioning of the reflector, thereby to permit tilt and pan movement of the reflector, and, in turn, thereby to permit corresponding dynamic change in the target area to which light energy reflected off of the reflector is transmitted.

The reflector-positioning apparatus 10 includes a pair of rotatable ring members 14 and 16 positioned in cascade upon one another, each separately rotatable about a first rotational axis 18.

The first rotatable ring member 14 is capable of rotation in either the clockwise direction, indicated by the arrow 22, or the counter clockwise direction, indicated by the arrow 24. Analogously, the second ring member 16 is also capable of rotation in both of the clockwise and counter clockwise directions indicated by the arrows 22 and 24, respectively.

The ring members are supported upon a platform 26 upon which a plurality of supportive roller guides are positioned. Three roller guides are here shown to be positioned at spaced locations about the ring members. Each of the roller guides 28 includes a pair of rollers which supportively engage with the respective ring members to provide rotatable support thereto.

The ring members 14 and 16 are coupled to separate force actuators 29 and 30 by way of drive belts 32 and 34, respectively. In this implementation, the drive belt 32 extends about the circumference of the rotatable ring member 14 and also about a rotor gear 36. The rotor gear 36 rotates responsive to actuation forces generated by the force actuator 29, such as a drive motor. Rotation of the rotor gear 36 causes corresponding rotation of the rotatable ring member 14.

Analogously, the drive belt 34 is positioned to extend about a circumference of the rotatable ring member 16 and also about a rotor gear 38. The rotor gear is rotatable responsive to generation of actuation forces by the force actuator 30, such as a drive motor. Rotation of the rotor gear 38 causes corresponding rotation of the drive belt 34 and, in turn, rotation of the rotatable ring member 16.

Rotation of the rotor gears 36 and 38 is effectuable in either the clockwise or counter clockwise directions. And, correspondingly, the rotation of the rotor gears in the selected directions, as well as rates, is imparted to the respective ring members 14 and 16, coupled to the rotor gears by the drive belts.

Rotatable guides 42 are also shown in the figure. The guides 42 function to guide the drive belts 32 and 34 to facilitate their engagement with the rotor gears and rotatable ring members.

An upstanding mounting arm 46 extends upwardly (as shown) beyond a top face surface of the rotatable ring member 14. The upstanding mounting arm 46 extends through a slotted opening 47 extending through the rotatable ring member 16. In the exemplary implementation shown in the figure, the upstanding mounting arm is formed of a bar member which extends in a direction substantially parallel to the direction of the first rotational axis 18. The mounting arm 46 includes a directional transducer 48 operable to transduce rotational movement of the rotatable ring member 14 about the first rotational axis into rotation about a second rotational axis 52. The directional transducer is formed of a portion of the bar member and a piece 54 which extends in a direction perpendicular to the direction in which the bar member extends.

The piece 54 provides for connection thereof with the reflector 12. A spring member (hidden from view in the Figure) is affixed to the piece 54 and provides a spring bias force to bias the reflector. Rotation of the first rotatable ring member in a direction indicated by the arrow 24, e.g., causes rotation of the reflector 12 in the direction indicated by the arrow 62. And, rotation of the rotatable ring member 14 in the direction indicated by the arrow 22 causes rotation, i.e., tilt, of the reflector in the direction indicated by the arrow 64. Thereby, through application of rotation forces to the ring member 14, movement of the reflector 12 is effectuated.

Additional upstanding mounting arms 68 also extend beyond a top face surface (as shown) as the second rotatable member 16. The upstanding mounting arm 68 also includes a mounting portion 72 including the hinged portion 57 through which the reflector is affixed and about which the reflector is permitted rotation, here also about the second rotational axis 52.

Rotation of the second ring member 16 also causes rotation of the reflector about the second rotational axis. The rotation of the rotatable ring member 16 in the direction indicated by the arrow 24, for instance, is transduced into rotation of the reflector in the direction indicated by the arrow 64. And, rotation of the ring member 16 in the direction indicated by the arrow 22 causes rotation of the reflector in the direction indicated by the arrow 62.

Rotation of only the ring member 14 causes tilt movement of the reflector. Rotation of both of the ring members concurrently and at the same rate causes pan movement of the reflector, as does also rotation of only the ring member 16. And rotation of both of the ring members concurrently but at different rates causes both pan and tilt movement of the reflector. Through appropriate selection of the rates of rotation of the separate rotatable ring members, any of many tilt and pan movements and differential rates of rotation can be effectuated.

Figure 2:
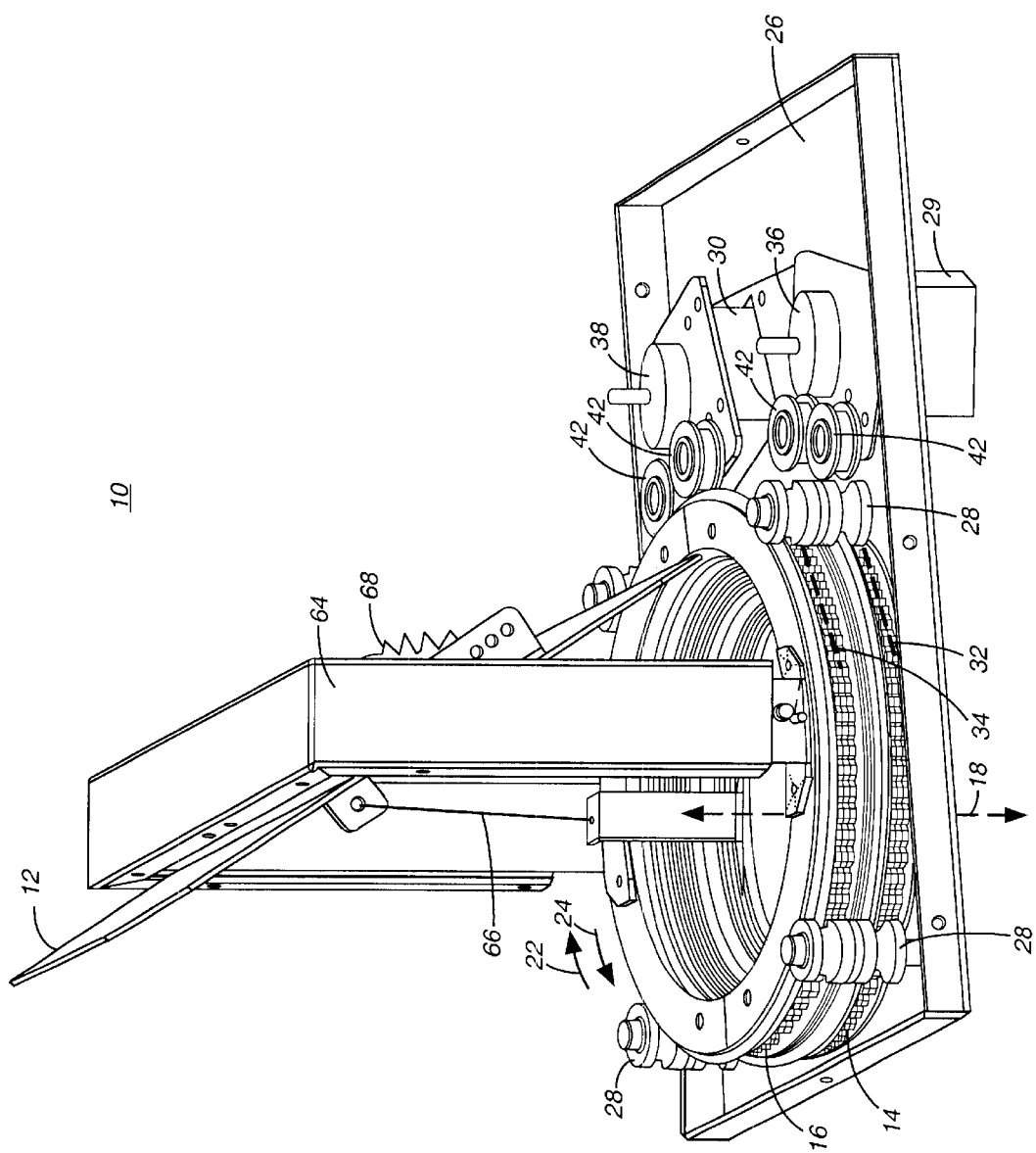
FIG. 2 illustrates a partial perspective, partial functional block diagram similar to that shown in FIG. 1 but of another embodiment of the present invention.

Referring next to FIG. 2, the reflector-positioning apparatus 10 of another embodiment of the present invention is shown. The apparatus is again operable to position the reflector 12 in a desired position.

The apparatus 10 of the embodiment shown in FIG. 2 again includes rotatable ring members 14 and 16 positioned and cascade upon one another, each separately rotatable about the first rotational axis 18.

Analogous to the implementation shown in FIG. 1, both the rotatable ring members are capable of rotation in either a clockwise or counterclockwise direction indicated by the arrows 22 and 24, respectively.

The ring members are again supported upon a platform 26 upon which a plurality of supportive roller guides 28 are positioned. Three roller guides are shown to be positioned at spaced locations about the ring members. Each of the roller guides 28 includes a pair of rollers which supportively engage with the respective ring members to provide rotatable support thereto.

Separate force actuators are coupled to the ring members 14 and 16 by way of drive belts 32 and 34, respectively. In another implementation, gear members are substituted for drive belts. Rotational forces generated by the force actuators are induced to the respective ring members to cause rotation thereof.

Forces generated by the force actuators cause rotation of rotor gears 36 and 38, respectively, which in turn cause rotation of the drive belts 34 and 36. Rotation of the rotor gears 36 and 38 is effectuable in either of the clockwise and counter-clockwise directions. Corresponding rotation of the ring members 14 and 16 is thereby effectuable.

Rotatable guides 42 are also again shown in the Figure. The guides 42 function to guide the drive belts 32 and 34 to facilitate their engagement with the rotor gears and rotatable ring members.

In this implementation, a frame member 64 is utilized to support the reflector 12. The frame member 64 is mounted upon the top ring member 16 such that rotation of the ring member causes corresponding rotation of the frame member. And, a cable 66 extends beyond the first ring member 14 to be connected to the reflector 12. Rotation of the first ring member causes corresponding rotation of the cable member 66 about the first rotational axis and in return, rotation of the reflector about the second rotational axis. A spring member 68 connected to the reflector 12 and to the frame member 64 biases positioning of the reflector 12.

Again, rotation of the ring member 14 and 16, together, or alone, and at corresponding, or differing rates, causes selective pan and tilt movement of the reflector 14. Operation of the apparatus 10 shown in FIG. 2 corresponds to operation of the apparatus shown and described with respect to FIG. 1.

Figure 3:
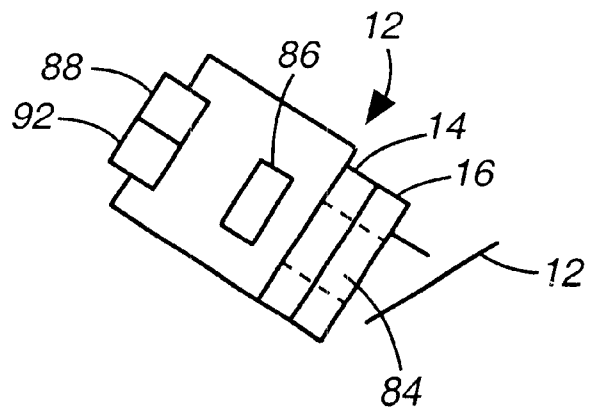
FIG. 3 illustrates a representation of operation of the apparatus shown in FIGS. 1 and 2 to direct light energy towards a target area.

FIG. 3 illustrates a lighting element 82 which includes the reflector-positioning apparatus 10 and reflector 12 shown previously in FIG. 1. The lighting element forms, for example, a stage lighting element or a landscape lighting element. Lighting element 82 is also representative of other types of lighting devices.

Again, the reflector-positioning apparatus 10 is shown to include first and second rotatable ring members 14 and 16, here within which a central cavity 84 is defined. A light source 86 is positioned at a side of the apparatus 10 opposing that of the side at which the reflector 12 is positioned. Light energy generated by the light source 86 is directed through the cavity 84 to be incident upon the reflector. Drive motors 88 and 92 also form portions of the lighting element. The drive motors 88 generate the actuation forces to cause rotation of the rotatable ring members 14 and 16 and, in turn, selected tilt or pan movement of the reflector 12. Through simple rotation of the rotatable elements 14 and 16, any of many varied pan and tilt movements of the reflector are effectuable.

Figure 4:
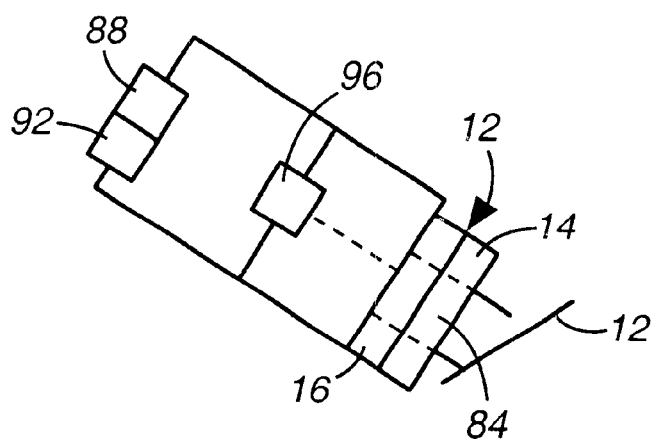
FIG. 4 illustrates a representation of operation of the apparatus shown in FIGS. 1 and 2 to direct light energy towards a light receiver.

FIG. 4 illustrates a light-receiver element 94 which includes the reflector-positioning apparatus 10 and reflector 12 shown previously in FIG. 1. The light-receiver element here forms a camera assembly operable to perform recording operations. The light-receiver element is analogous to other types of apparatus which operates upon light-energy provided to a light receiver.

Again, the reflector-positioning apparatus 10 is shown to include first and second rotatable ring members 14 and 16, here within which a central cavity 84 is defined. A light receiver 96 is positioned at a side of the apparatus 10 opposing that of the side at which the reflector 12 is positioned. Incident light-energy incident upon the reflector 12 is directed through the cavity to be received at the light receiver 96. Drive motors 88 and 92 also form portions of the light-receiver element. The drive motors 88 and 92 generate the actuation forces to cause rotation of the rotatable ring members 14 and 16, and, in turn, selected tilt or pan movement of the reflector 12. Through simple rotation of the rotatable elements 14 and 16, any of many varied pan and tilt movements of the reflector are effectuable.

Figure 5:
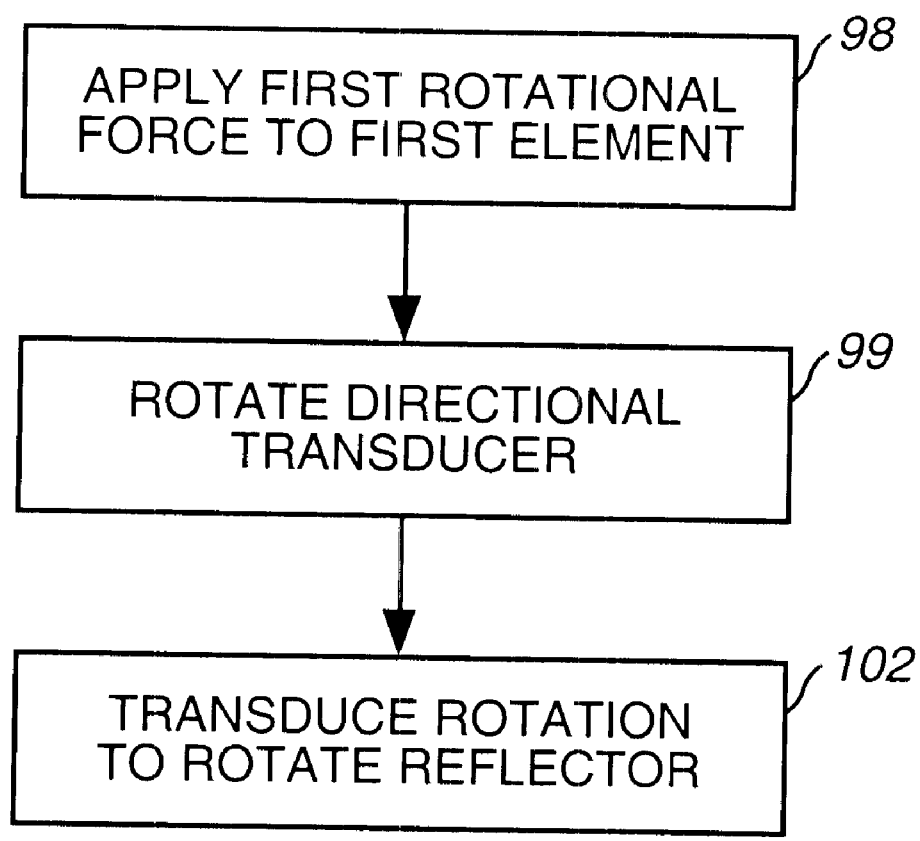
FIG. 5 illustrates a method flow diagram listing the method of operation of an embodiment of the present invention.

FIG. 5 illustrates a method flow diagram, shown generally at 97, of an embodiment of the present invention. The method is operable to position a reflector which reflects incident light energy generated during operation of a light assembly towards a target.

First, and as indicated by the block 98, a first rotational force is applied to a first rotatable element capable of rotational movement in a first selected rotational direction about a first rotational axis. Then, and as indicated by the block 99, a directional transducer is rotated together with the rotation of the first rotatable element about the first rotational axis. The reflector is mounted to the first directional transducer. Then, and as indicated by the block 102, the rotation about the first rotational axis is transduced into rotation of the reflector about the second rotational axis.

Thereby, a manner is provided for positioning the reflector to reflect incident light energy towards the target. Simple rotational forces are generated and transduced to cause desired movement of the reflector.

The preferred descriptions are of preferred examples for implementing the invention, and the scope of the invention should not necessarily be limited by this description. The scope of the present invention is defined by the following claims.

I claim:

1. In a light assembly operable to reflect incident light energy towards a selected target location, an improvement of reflector-positioning apparatus for positioning a reflector from which the light energy is reflected towards the selected target location, said reflector-positioning apparatus comprising:

a first rotatable element capable of rotational movement in a first selected manner about a first rotational axis responsive to application of a first rotational force thereon;

a second rotatable element capable of rotational movement in a second selected manner about the first rotational axis responsive to application of a second rotational force thereon;

a first directional transducer coupled to said first rotatable element and to which the reflector is mounted, said first directional transducer rotatable about the first rotatable axis together with rotation of said first rotatable element, and said first directional transducer for transducing the rotation thereof about the first rotational axis into rotation of the reflector about a second rotational axis; and a second directional transducer coupled to said second rotatable element and to which the reflector is mounted, said second directional transducer rotatable about the first rotatable axis together with rotation of said second rotatable element, and said second directional transducer for transducing rotation thereof about the first rotational axis into rotation of the reflector about a third rotational axis.

2. The reflector-positioning apparatus of claim 1 wherein said first rotatable element comprises a first ring member having a central aperture, said first ring member rotatable about the first rotational axis responsive to the application of the first rotational force thereon.

3. The reflector-positioning apparatus of claim 2 further comprising a first rotational force generator coupled to said first ring member, said first rotational force generator selectably operable to generate the first rotational force applied to said first ring member.

4. The reflector-positioning apparatus of claim 3 further comprising a first force translator, said first force translator connected to said first rotational force generator and to said first ring member, said first force translator for imparting the first rotational force generated by said first rotational force generator to said first ring member.

5. The reflector-positioning apparatus of claim 2 wherein said first directional transducer comprises an upstanding member positioned to extend above said first ring member.

6. The reflector-positioning apparatus of claim 2 further comprising a light source positioned to generate the incident light energy incident upon the reflector, the reflector positioned at a first side of said first ring member and said light source positioned at a second side of said first ring member.

7. The reflector-positioning apparatus of claim 1 wherein the second rotational axis and the third rotational axis are coincident.

8. The reflector-positioning apparatus of claim 1 wherein said first rotatable element is rotated at a first rate and said second rotatable element is rotated at a second rate, thereby to define a differential rate of rotation, between the first and second rates, respectively, the differential rate of rotation causing tilt movement of the reflector about the second axis of rotation.

9. The reflector-positioning apparatus of claim 1 wherein said first rotatable element and said second rotatable element are together rotated at a common rotation rate, causing movement of the reflector about the first axis of rotation.

10. The reflector-positioning apparatus of claim 1 wherein, when only said second rotatable element is rotated at a selected rotation rate, movement of the reflector is effectuated about both the first and the second axes of rotation.

11. The reflector-positioning apparatus of claim 1 wherein said second rotatable element comprises a second ring member having a central aperture, said second ring member rotatable about the first rotational axis responsive to the application of the first rotational force thereon.

12. The reflector-positioning apparatus of claim 11 further comprising a second rotational force generator coupled to said second ring member, said second rotational force generator selectably operable to generate the second rotational force applied to said second ring member.

13. The reflector-positioning apparatus of claim 12 further comprising a second force translator connected to said second rotational force generator and to said second ring member, said second force translator for imparting the second rotational force generated by said second rotational force generator to said second ring member.

14. The reflector-positioning apparatus of claim 8 wherein said second directional transducer comprises a second upstanding member positioned to extend above said second ring member.

15. The reflector positioning apparatus of claim 14 wherein said first ring member and said second ring member are positioned in cascade.

16. The reflector-positioning apparatus of claim 15 further comprising a light source for generating incident light energy, and wherein the incident light energy generated by said light source is directed through apertures defined by said first and second ring members, respectively.

17. The reflector-positioning apparatus of claim 15 further comprising a light receiver for receiving light energy, and wherein incident light energy incident upon the reflector is directed through apertures defined by said first and second ring members, respectively, thereafter to be received at said light receiver.

18. A method for positioning a reflector operable to reflect incident light energy generated during operation of a light assembly towards a target, said method comprising:

applying a first rotational force to a first rotatable element capable of rotational movement in a first selected manner about a first rotational axis;

rotating a first directional transducer together with rotation of the first rotatable element about the first rotational axis, the reflector mounted to the first directional transducer;

transducing the rotation about the first rotational axis into rotation of the reflector about the second rotational axis;

applying a second rotational force to a second rotatable element capable of rotational movement in a second selected manner about the first rotational axis;

rotating a second directional transducer together with rotation of the second rotatable element about the first rotational axis, the reflector further mounted to the second directional transducer; and transducing the rotation about the first rotational axis into rotation of the reflector about a third rotational axis.

19. The method of claim 18 wherein the first rotatable element rotated during said operation of rotating the first rotatable element is rotated at a first rate and the second rotatable element rotated during said operation of rotating the second rotatable element is rotated at a second rate, thereby to define a differential rate of rotation between the first and second rates, respectively, the differential rate of rotation causing tilt movement of the reflector as a result of rotation of the reflector about the second and third axes of rotation, respectively.

20. The method of claim 19 further comprising the initial operation of selecting the pan movement to be effectuated responsive to rotation during said operation of applying, respectively, and wherein the first and second rotational forces applied during said operations of applying are of levels to effectuate the pan movement.

21. The method of claim 20 further comprising the operations of:

generating the first rotational force; and generating the second rotational force.

22. The method of claim 21 comprising the additional operation of generating the light energy forming the incident light energy incident upon the reflector.

* * * * *